United States Patent [19]
Tanimoto et al.

[11] Patent Number: 5,969,706
[45] Date of Patent: Oct. 19, 1999

[54] INFORMATION RETRIEVAL APPARATUS AND METHOD

[75] Inventors: Akira Tanimoto, Kashihara; Toshiyuki Masui, Meguro-ku, both of Japan

[73] Assignee: Sharp Kabushiki Kaisha, Osaka, Japan

[21] Appl. No.: 08/731,432

[22] Filed: Oct. 15, 1996

[30] Foreign Application Priority Data

Oct. 16, 1995 [JP] Japan ................................. 7-267487

[51] Int. Cl.⁶ ........................................................ G09G 5/26
[52] U.S. Cl. ........................... 345/130; 345/127; 345/439
[58] Field of Search ................................. 345/130, 173, 345/118, 439, 127, 128–131, 472, 342, 146; 382/298, 300, 299; 358/451

[56] References Cited

U.S. PATENT DOCUMENTS 5,341,466  8/1994  Perlin et al. ............................ 345/439
5,539,427  7/1996  Bricklin et al. ......................... 345/118

FOREIGN PATENT DOCUMENTS 5-224870  9/1993  Japan .

*Primary Examiner*—Richard A. Hjerpe
*Assistant Examiner*—Francis Nguyen
*Attorney, Agent, or Firm*—Nixon & Vanderhye P.C.

[57] ABSTRACT

An information retrieval apparatus includes a display section for displaying a first image; an enlargement section for continuously enlarging the first image displayed by the display section in response to an instruction of the user; and a determination section for determining that a magnification ratio of the first image enlarged by the enlargement section has reached a prescribed value. When the magnification ratio is determined to have reached the prescribed value, the display section displays at least one second image at a position related to the first image. When the first image is still enlarged by the enlargement section, the enlargement section enlarges the at least one second image at a magnification ratio equal to the magnification ratio used for enlarging the first image.

10 Claims, 15 Drawing Sheets

FIG.17

| August | SUN | MON | TUE | WED | THU | FRI | SAT |
|---|---|---|---|---|---|---|---|
| ◁ | | | 1 | 2 | 3 | 4 | 5 |
| ◁ | 6 | 7 | 8 | 9 | 10 | 11 | 12 |
| ◁ | 13 | 14 | 15 | 16 | 17 | 18 | 19 |
| ◁ | 20 | 21 | 22 | 23 | 24 | 25 | 26 |
| ◁ | 27 | 28 | 29 | 30 | 31 | | |

1995 ◁Daily graph ◁Daily table

FIG.18

August 11, 1995 (Fri)  ◁Daily graph

| 9:30 a.m. to 11:00 a.m. | Product meeting | ⇧ |
|---|---|---|
| 1:00 p.m. to 2:30 p.m. | Client | ⇩ |
| 3:00 p.m. to 5:00 p.m. | Kick-off ceremony | |
| | | |
| | | |
| | | |

FIG.21

Week of August 6, 1995 <Weekly graph

| | | | | | |
|---|---|---|---|---|---|
| 6 | SUN | | | | ⇧ |
| 7 | MON | | | | ⇩ |
| 8 | TUE | | | | |
| 9 | WED | | | | |
| 10 | THU | | | | |
| 11 | FRI | Product meeting | Client | Kick-off ceremony | |
| 12 | SAT | | | | |

FIG.22

Week of August 6, 1995 <Weekly table

INFORMATION RETRIEVAL APPARATUS AND METHOD

BACKGROUND OF THE INVENTION

1. Field of the Invention

The present invention relates to an information retrieval apparatus and method, and in particular to an information retrieval apparatus and method which provide a user interface appropriate for conveying the user's intention more directly.

2. Description of the Related Art

A conventionally known electronic device for managing a schedule is, for example, an electronic diary. An electronic diary provides information related to the user's schedule which is stored therein hierarchically, responsive to an instruction of the user.

With reference to FIGS. 17 through 22, displays sequentially obtained in a conventional electronic diary will be described.

FIG. 17 shows a monthly calendar displayed on the screen of the conventional electronic diary. In this example, the calendar of August, 1995 is displayed. If the user needs to check his schedule on Aug. 11, 1995, the user presses "11" in the calendar twice with an input pen to cause a table shown in FIG. 18 to be displayed on a screen of the conventional electronic diary.

The table in FIG. 18 shows the user's schedule on Aug. 11, 1995. If an excessive number of items are scheduled for a certain day to be shown on one display, the remaining items can be scrolled through using a down scroll arrow or the like.

If the user needs to check his free time on Aug. 11, 1995, the user selects a "daily graph" in FIG. 18 using the input pen to cause a line graph shown in FIG. 19 to be displayed on the screen.

In the line graph in FIG. 19, the hatched areas represent time slots in which some items are scheduled, and the blank areas represent free time slots.

If the user needs to check his schedule of the same day again, the user selects the "daily table" with the input pen to cause the table shown in FIG. 18 to be displayed again on the screen.

If the user needs to check the details of any particular scheduled item, for example, the product meeting, the user selects the corresponding box in FIG. 18 with the input pen to cause the table shown in FIG. 20 to be displayed on the screen. FIG. 20 shows the details of the product meeting.

Another conventional electronic diary can display a weekly schedule as shown in FIG. 21 or free time on a weekly basis as shown in FIG. 22.

In the above-described conventional electronic devices, only one type of display is obtained on the screen when the user inputs one type of instruction, in general. In such devices, the intention of the user is conveyed to the electronic device in discrete units for each display but not conveyed sequentially.

SUMMARY OF THE INVENTION

According to one aspect of the present invention, an information retrieval apparatus includes a display section for displaying a first image; an enlargement section for continuously enlarging the first image displayed by the display section in response to an instruction of the user; and a determination section for determining that a magnification ratio of the first image enlarged by the enlargement section has reached a prescribed value. When the magnification ratio is determined to have reached the prescribed value, the display section displays at least one second image at a position related to the first image. When the first image is still enlarged by the enlargement section, the enlargement section enlarges the at least one second image at a magnification ratio equal to the magnification ratio used for enlarging the first image.

According to another aspect of the present invention, an information retrieval method includes the steps of displaying a first image; continuously enlarging the first image displayed in the step of displaying in response to an instruction of the user; determining that a magnification ratio of the first image enlarged in the step of enlarging has reached a prescribed value, and displaying at least one second image at a position related to the first image when the magnification ratio is determined to have reached the prescribed value, and then, when the first image is still enlarged by the enlargement section, enlarging the at least one second image at a magnification ratio equal to the magnification ratio used for enlarging the first image.

Thus, the invention described herein makes possible the advantages of offering an information retrieval apparatus and method which provide a user interface appropriate for conveying the user's intention more directly. More specifically, the invention described herein makes possible the advantages of providing an information retrieval apparatus and method for smoothly performing information retrieval from general information to specific information in the process of a continuous zooming-in operation, and performing information retrieval from specific information to general information in the process of a continuous zooming-out operation.

These and other advantages of the present invention will become apparent to those skilled in the art upon reading and understanding the following detailed description with reference to the accompanying figures.

BRIEF DESCRIPTION OF THE DRAWINGS

FIGS. 17 through 22 show displays sequentially obtained on a screen in a conventional electronic diary.

DESCRIPTION OF THE PREFERRED EMBODIMENTS

Hereinafter, the present invention will be described by way of illustrative examples with reference to the accompanying drawings.

Figure 1:
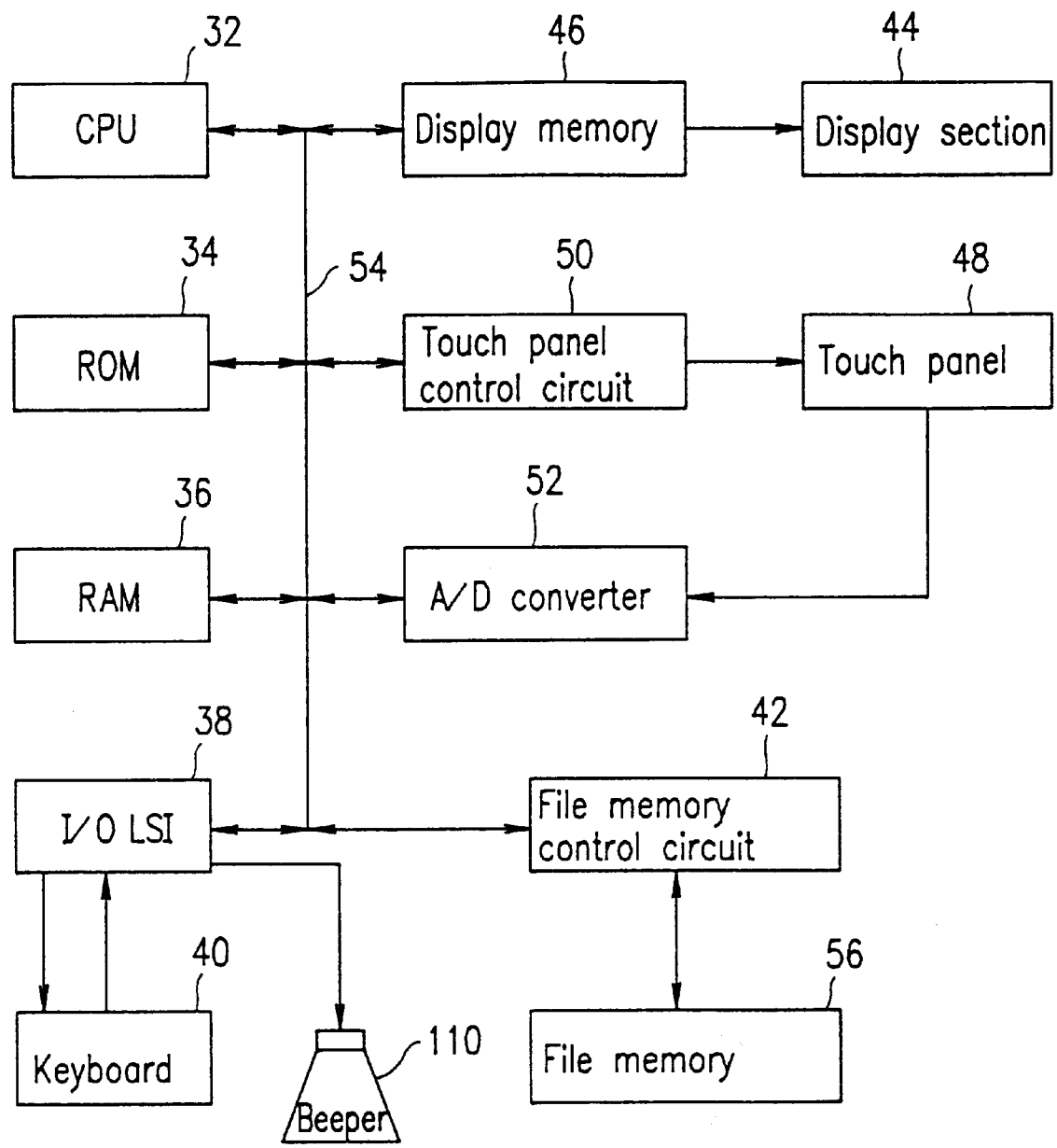
FIG. 1 is a block diagram showing a structure of an information retrieval apparatus 100 according to the present invention.

FIG. 1 is a block diagram showing a structure of an information retrieval apparatus 100 according to the present invention.

As shown in FIG. 1, the information retrieval apparatus 100 includes a central processing unit (CPU) 32 for controlling the operation of the information retrieval apparatus 100 and a bus 54 to which the CPU 32 is connected. Other sections of the information retrieval apparatus 100 described below are all connected to the bus 54 unless specified otherwise.

The information retrieval apparatus 100 further includes a read only memory (ROM) 34, a random access memory (RAM) 36, and an I/O LSI 38. The ROM 34 stores a system program for controlling the operation of the information retrieval apparatus 100. The system program stored in the ROM 34 is read and executed by the CPU 32. The RAM 36 includes a work area for the program to be executed by the CPU 32 and an area for storing data which is to be input by the user. The I/O LSI 38 is connected to a keyboard 40 having keys and also to a beeper 110 for generating a notification sound for notifying the user of a state of the information retrieval apparatus 100. The I/O LSI 38 is provided for inputting the state of the keyboard 40 to the CPU 32 and also for supplying a signal to instruct the beeper 110 to generate a notification sound based on the instruction of the CPU 32.

The information retrieval apparatus 100 further includes a display memory 46 and a display section 44 connected to the display memory 46. The display section 44 displays the contents of the data which is written in the display memory 46. The display section 44 includes, for example, a liquid crystal display.

The information retrieval apparatus 100 further includes a touch panel control circuit 50, an analog touch panel 48 connected to the touch panel control circuit 50, an analog/digital converter (A/D converter) 52, a file memory control circuit 42, and a file memory 56 connected to file memory control circuit 42. The analog touch panel 48 is connected to the bus 54 through the A/D converter 52. The file memory control circuit 42 controls writing of the data to the file memory 56 and reading of the data from the file memory 56. The file memory 56 includes, for example, an IC memory card or a hard disk.

The ROM 34 stores a recognition program for recognizing characters and symbols based on the stroke coordinate information hand-written on the touch panel 48, font information and the like, in addition to the system program described above. The ROM 34 further stores image information regarding functions which are used relatively frequently and a coordinate conversion table. The file memory 56 stores information regarding the other functions.

The touch panel 48 includes a light-transmitting tablet provided on a display area of the display section 44. The tablet includes, for example, a pair of light-transmitting substrates having flexibility and a resistive film provided on each of the substrates. The resistive film is formed of ITO (indium tin oxide) or the like. The substrates are located so that the resistive films thereon face each other with a gap therebetween.

The touch panel operates in the following manner. First, a prescribed voltage is applied to one of the resistive films (first resistive film). The level of the voltage continuously changes from an input to an output of the first resistive film. In this case, the other resistive film (second resistive film) is not grounded, and the voltage of the second resistive film is detected.

When the tablet is touched by the input pen while the first resistive film is supplied with a voltage, the resistive films contact each other at the point touched by the input pen, and the voltage of the second resistive film is detected. When a direction from the input to the output of the first resistive film is the direction of an X axis of the orthogonal coordinate system, the detected voltage represents the coordinate in the direction of the X axis. Then, the second resistive film is supplied with a voltage so that the current flows in a direction of the Y axis perpendicular to the direction of the X axis, and the voltage of the first resistive film is detected. The detected voltage represents the coordinate in the direction of the Y axis.

The voltage detection in the direction of the X axis and the voltage detection in the direction of the Y axis are performed alternately at prescribed switching timing. Thus, the coordinates of the points touched by the input pen are sequentially detected. The CPU 32 operates in accordance with the icon, key or button displayed in the coordinate.

The tablet can be the one described in, for example, Japanese Laid-Open Patent Publication No. 7-13679 or can be an electrostatic or electromagnetic type tablet described in, for example, Japanese Patent Publication No. 7-69763.

The voltages to be applied to the resistive films in the directions of the X and Y axes are controlled by the touch panel control circuit 50.

The coordinate (X, Y) obtained as an analog value in the above-described manner is sent to the A/D converter 52. The A/D converter 52 converts the analog value to a digital value which can be processed by the CPU 32.

With reference to FIGS. 2 through 11, an exemplary operation of the information retrieval apparatus 100 will be described.

Figure 2:
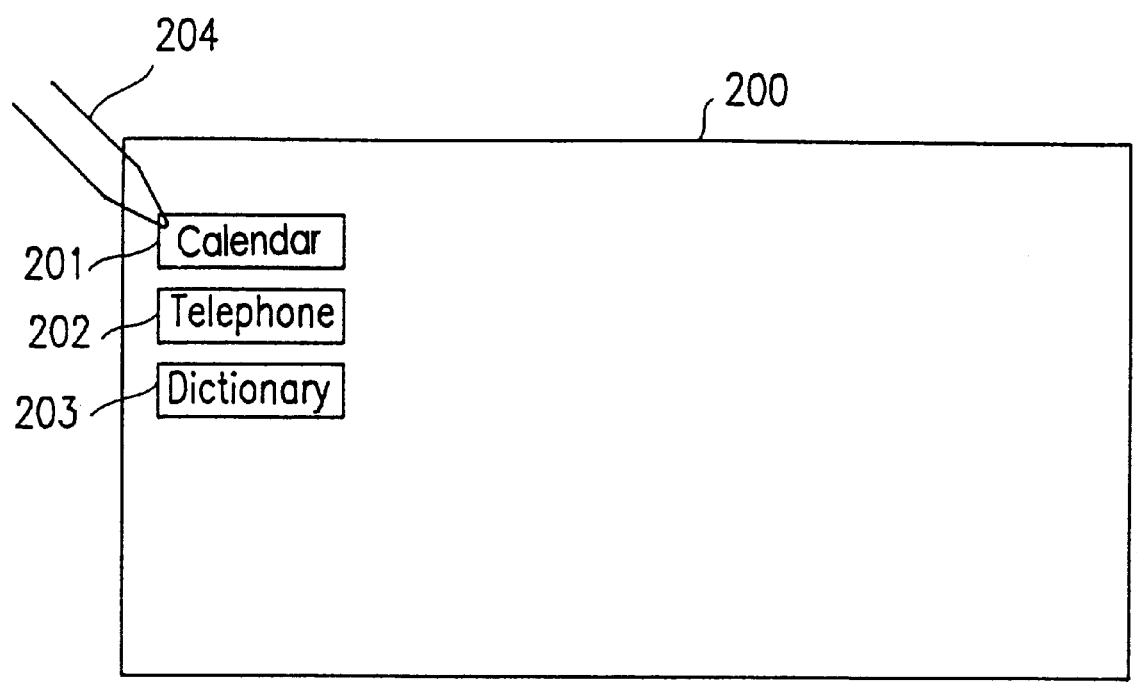
FIGS. 2 through 11 show displays sequentially obtained on a screen of the information retrieval apparatus 100.
Figure 3:
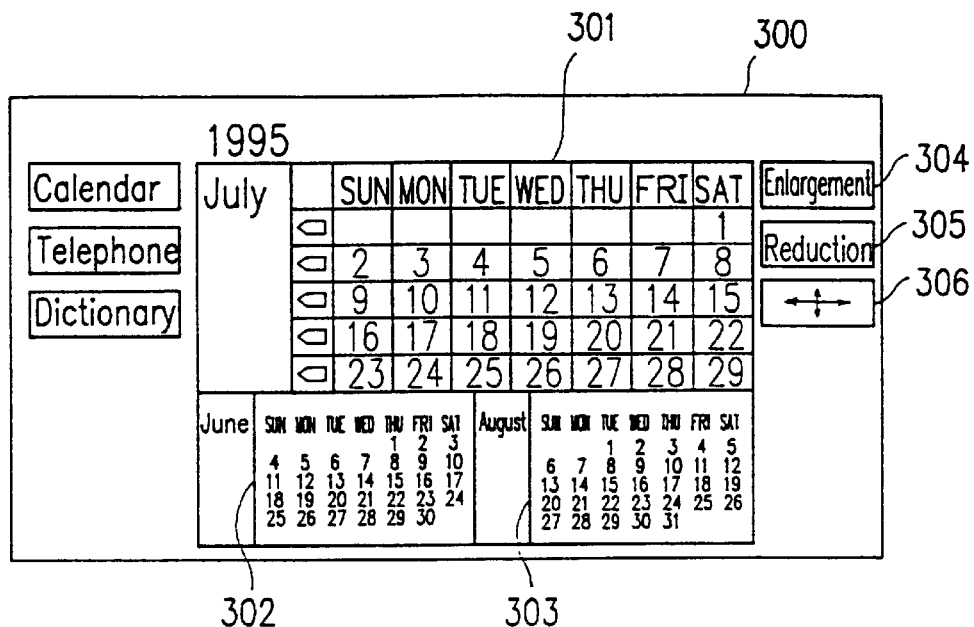

FIG. 2 shows a display 200 displayed on a screen by the display section 44 when the information retrieval apparatus 100 is turned on. As shown in FIG. 2, the display 200 includes a calendar mode key 201, a telephone mode key 202 and a dictionary mode key 203, each of which is used for selecting an application program to be executed by the CPU 32. For example, when the calendar key 201 is touched by an input pen 204, a display 300 shown in FIG. 3 appears on the screen of the display section 44.

The display 300, which is an initial display of the calendar application, includes calendars for three months, namely, the calendar of the current month 301 (July, 1995 in this example), the calendar of the previous month 302 (June, 1995) and the calendar of the subsequent month 303 (August, 1995). The calendars 302 and 303 are preferably displayed in a smaller size than that of the calendar 301.

The display 300 further includes three operation keys, namely, an enlargement key 304, a reduction key 305 and a move key 306 which are used for controlling image information displayed on the screen of the display section 44. When one of the calendars 301 through 303 is touched by the input pen 204 (FIG. 2), a display showing only the selected calendar appears on the screen. For example, when the calendar 303 is touched, a display 400 shown in FIG. 4 is obtained on the screen.

Figure 4:
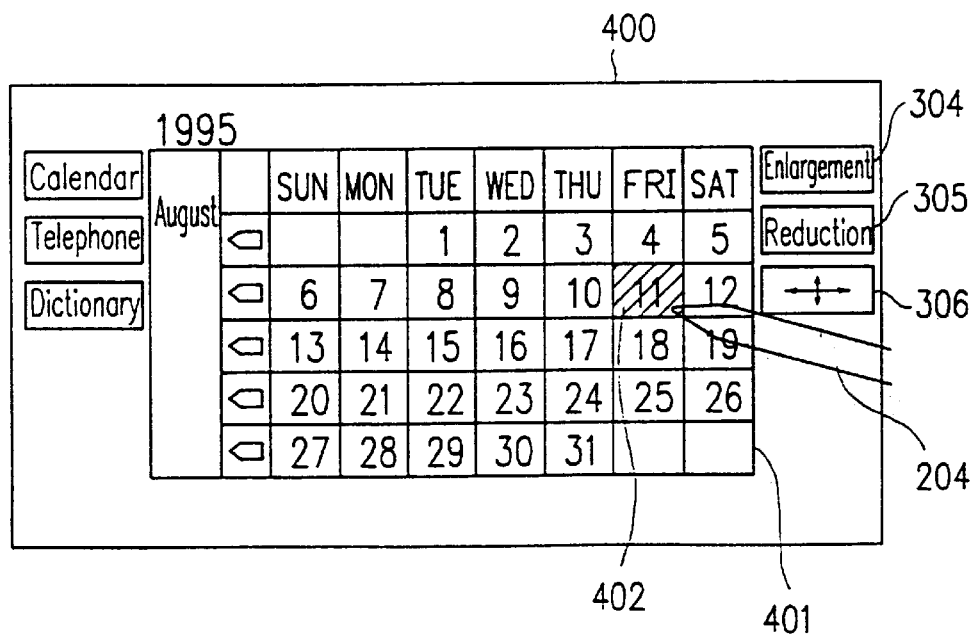

In FIG. 4, the selected calendar is represented by reference numeral 401. In this example, the calendar 401 is of August, 1995. As shown in FIG. 4, the calendar 401 includes a plurality of day fields 402 respectively corresponding to all the days of the month (i.e., August 1 through August 31). Each day field is a square. If the user intends to retrieve his schedule on Aug. 11, 1995, the user touches the enlargement key 304 with the input pen 204 and then touches the day field 402 of August 11 in the calendar 401 with the input pen 204. This operation is performed to convey the user's intention of retrieving the schedule on August 11 to the information retrieval apparatus 100. While the input pen 204 is in contact with the day field 402 of August 11, the day field 402 of August 11 is continuously enlarged (zoom-in operation). In other words, the zoom ratio (i.e., magnification ratio) increases in proportion to the time period in which the input pen 204 is in contact with the day field 402 of August 11. In this specification, the phrase "zoom ratio" or "magnification ratio" is defined as:

$$\frac{\text{Length of each side of day field currently displayed}}{\text{Reference length}} \times 100$$

where the reference length is the length of each side of the day field 402 in the display 400.

Figure 5:
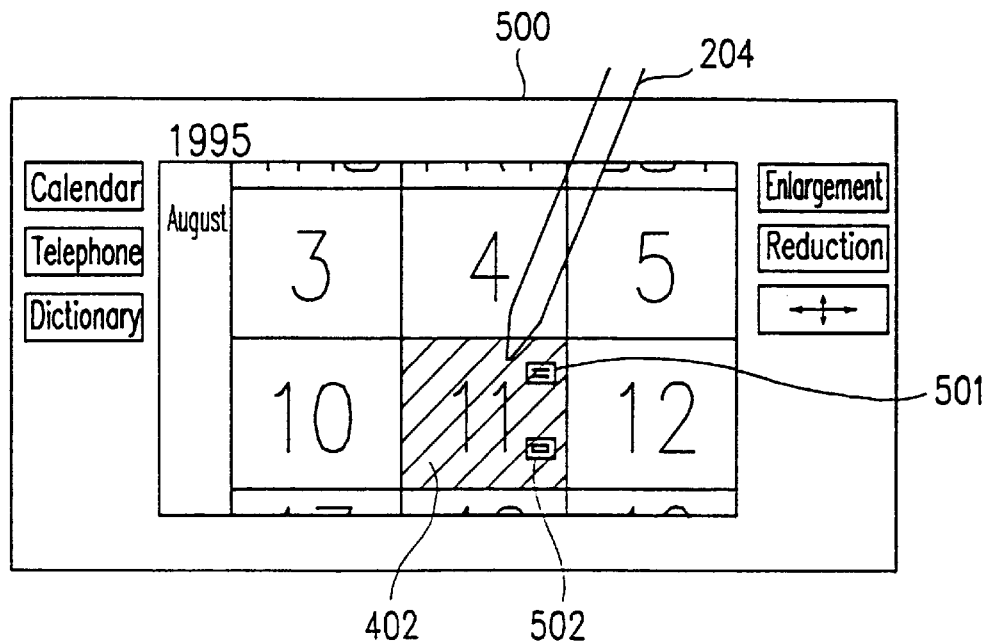

The zoom ratio is continuously increased. FIG. 5 shows a display 500, in which the day field 402 is enlarged at a prescribed zoom ratio. In this state, symbols 501 and 502 appear in the day field 402 of August 11. At this stage, the symbols 501 and 502 can be too small to allow the user to recognize what the symbols 501 and 502 represent. As the zoom ratio further increases as described below, the symbols 501 and 502 also enlarge.

When the input pen 204 is still in contact with the day field 402 of August 11, the zoom ratio further increases in proportion to the time period in which the input pen 204 is in contact with the day field 402 of August 11. As the zoom ratio increases, the day field 402 of August 11 and the symbols 501 and 502 enlarge at the same ratio. Thus, the user gradually recognizes what the symbols 501 and 502 represent as the symbols 501 and 502 are enlarged (see the display 600 in FIG. 6). The symbol 501 represents a daily table, and the symbol 502 represents a daily graph. A daily table shows items scheduled on a particular day (Aug. 11, 1995 in this case) in different time slots. A daily graph shows time slots in which some items are scheduled on a particular day.

Figure 7:
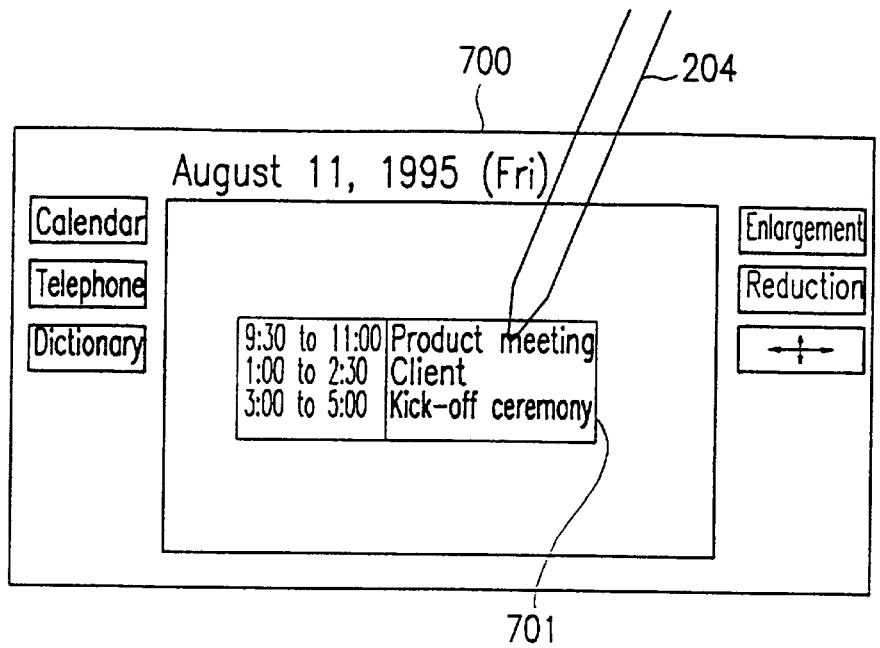
Figure 8:
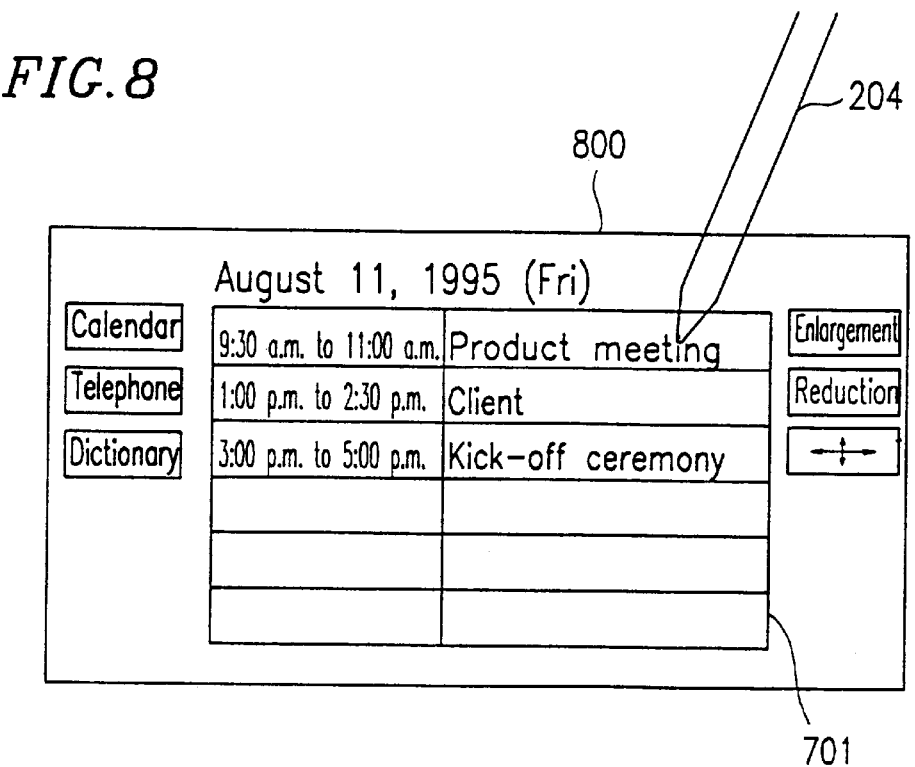

When the symbol 501 is touched by the input pen 204, a display 700 shown in FIG. 7 is obtained on the screen. The display 700 includes a daily table 701 of August 11. In the display 700, the time slots are not labelled "a.m." or "p.m.". If the user intends to check the daily table 701 in more detail, the user touches the daily table 701 with the input pen 204. This operation is performed in order to convey the user's intention of checking the contents of the daily table 701 in more detail to the information retrieval apparatus 100. While the input pen 204 is in contact with the daily table 701 of August 11, the daily table 701 is continuously enlarged (zoom-in operation). In other words, the zoom ratio increases in proportion to the time period in which the input pen 204 is in contact with the daily table 701 of August 11. FIG. 8 shows a display 800, in which the daily table 701 is enlarged to a sufficiently large size to label the time slots "a.m." or "p.m.".

Figure 9:
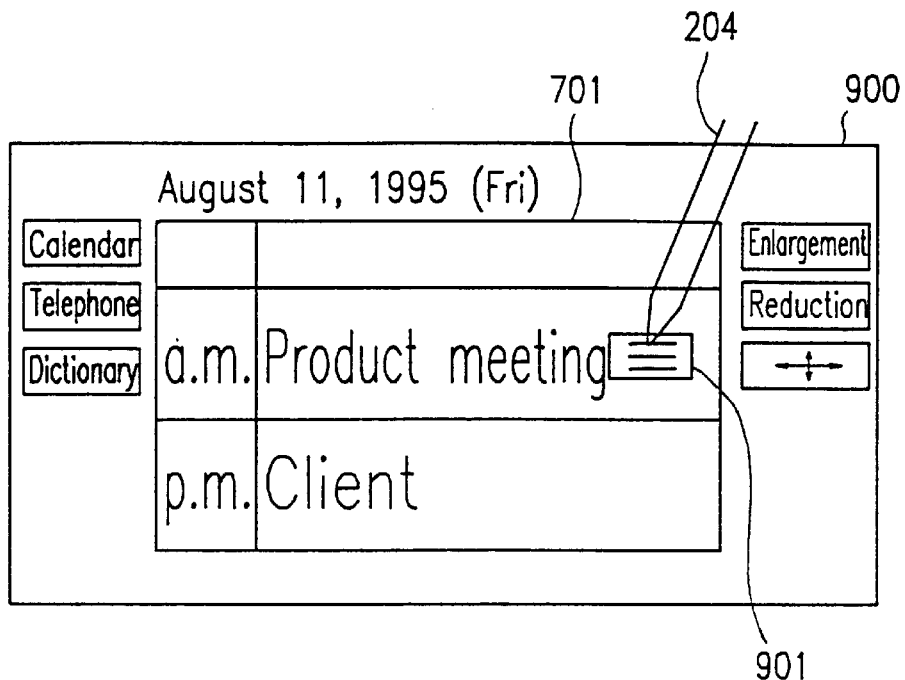

The zoom ratio is continuously increased. FIG. 9 shows a display 900, in which the daily table 701 is enlarged at a prescribed zoom ratio. In this state, a symbol 901 appears in at least one of the boxes in the daily table 701 (in the box of the "product meeting" in this example). At this stage, the symbol 901 can be too small to allow the user to recognize what the symbol 901 represents. As the zoom ratio further increases as described below, the symbol 901 also enlarges.

When the input pen 204 is still in contact with the daily table 701 of August 11, the zoom ratio further increases in proportion to the time period in which the input pen 204 is in contact with the daily table 701. As the zoom ratio increases, the daily table 701 and the symbol 901 enlarge at the same ratio. Thus, the user gradually recognizes what the symbol 901 represents. In this example, the symbol 901 represents details of the product meeting.

Figure 10:
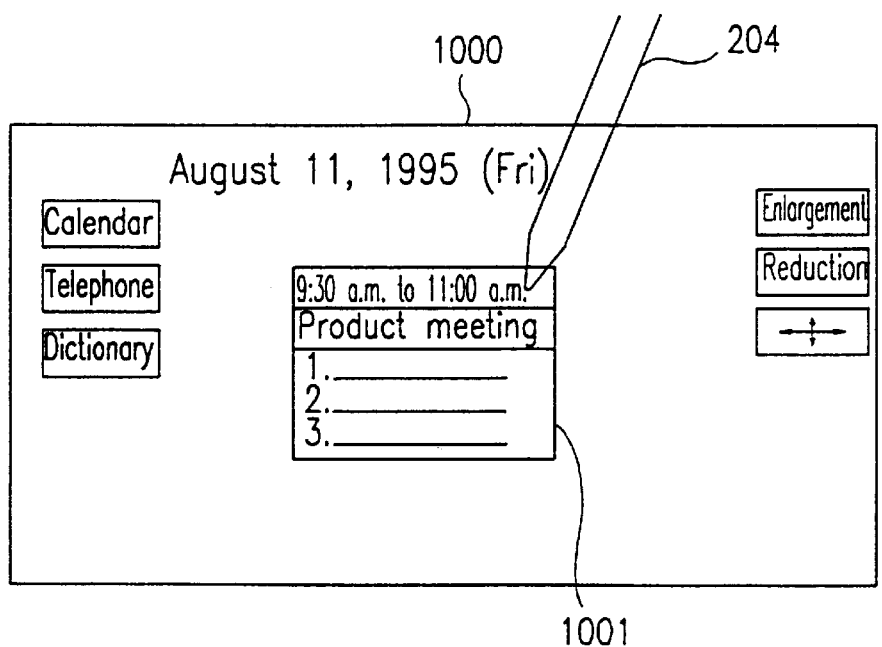
Figure 11:
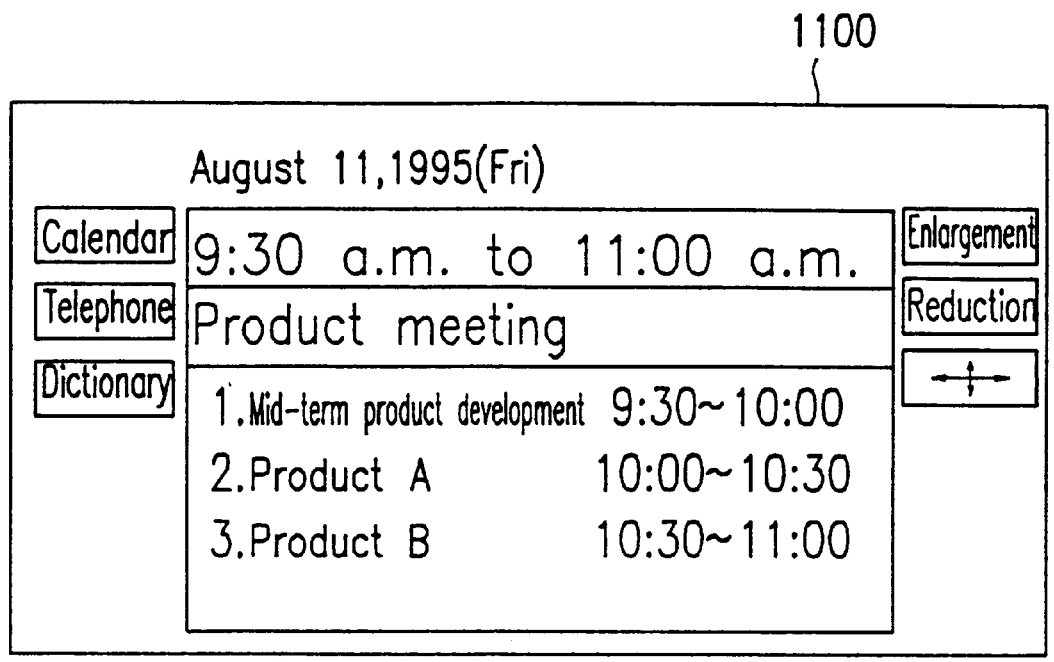

When the symbol 901 is touched by the input pen 204, a display 1000 shown in FIG. 10 is obtained on the screen. The display 1000 includes an agenda 1001 of the product meeting on August 11. If the user intends to check the details of the agenda 1001, the user touches the agenda 1001 with the input pen 204. This operation is performed in order to convey the user's intention of checking the details of the agenda 1001 to the information retrieval apparatus 100. While the input pen 204 is in contact with the agenda 1001, the agenda 1001 is continuously enlarged. In other words, the zoom ratio increases in proportion to the time period in which the input pen 204 is in contact with the agenda 1001. FIG. 11 shows a display 1100, in which the agenda 1001 is enlarged to a sufficiently large size to allow the user to check the details thereof.

In the above-described example, the schedule on Aug. 11, 1995 is retrieved, but the same procedure can be used for retrieving the schedule on any other day. Preferably, entry of a newly scheduled item and change of a currently scheduled item can be performed.

Figure 6:
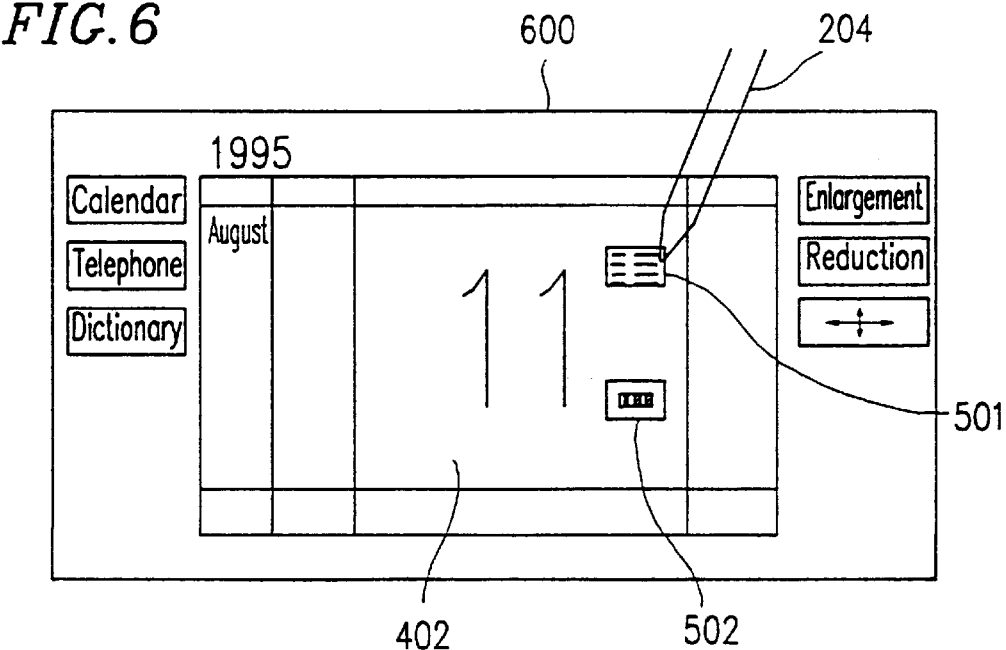

As shown in FIGS. 5 and 6, the displays 500 and 600 each include the symbol 502 in addition to the symbol 501. When the symbol 502 is touched by the input pen 204, the daily graph (not shown) is displayed.

In the information retrieval apparatus 100 according to the present invention, information retrieval can be smoothly performed from general information to specific information by continuously enlarging the selected day field using the input pen 204. In the same manner, information retrieval can be smoothly performed from specific information to general information by continuously reducing the selected day field using the input pen 204. The input pen 204 touches the reduction key 305 for the reduction.

In a conventional information retrieval apparatus, the user needs to operate a particular switch or button in order to change one display to another. In contrast, in an information retrieving apparatus according to the present invention, the displays can be continuously changed automatically during the zoom-in or zoom-out operation of the image data displayed on the screen. In other words, the information retrieval apparatus according to the present invention provides a user interface which is appropriate to convey the user's intention more directly.

Figure 12:
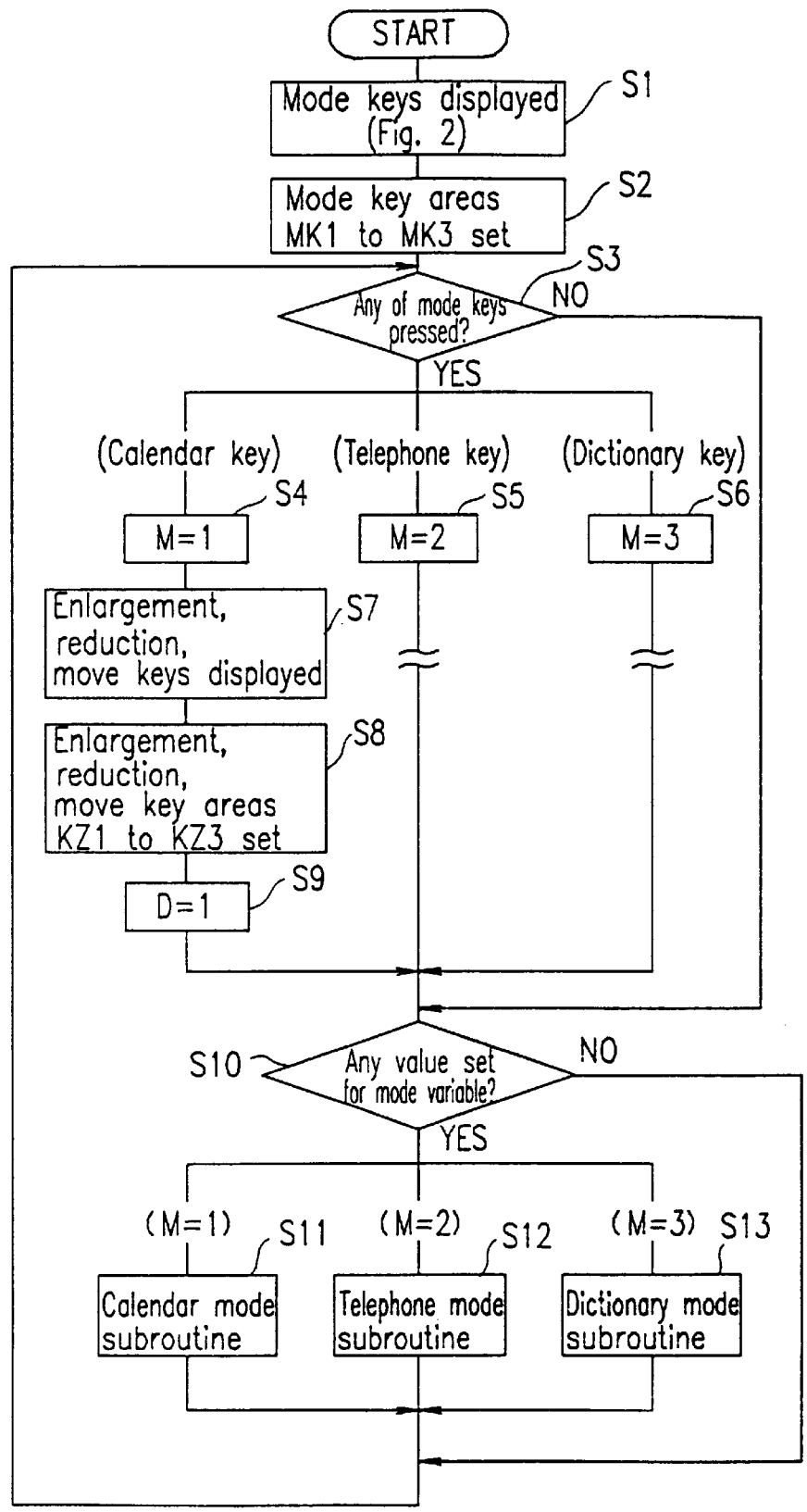
FIGS. 12 through 14 are flowcharts illustrating the operation of the information retrieval apparatus 100.
Figure 13:
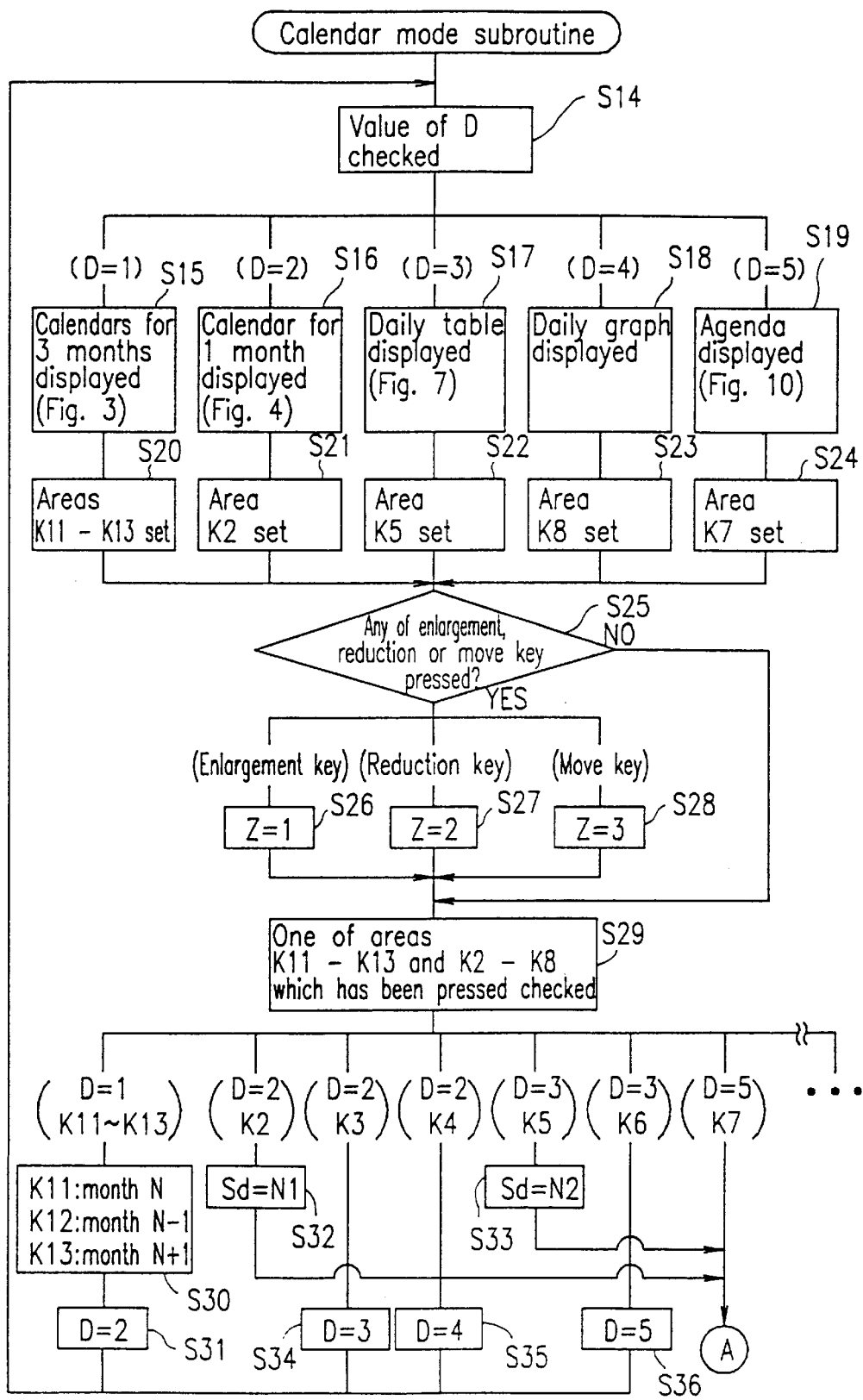
Figure 14:
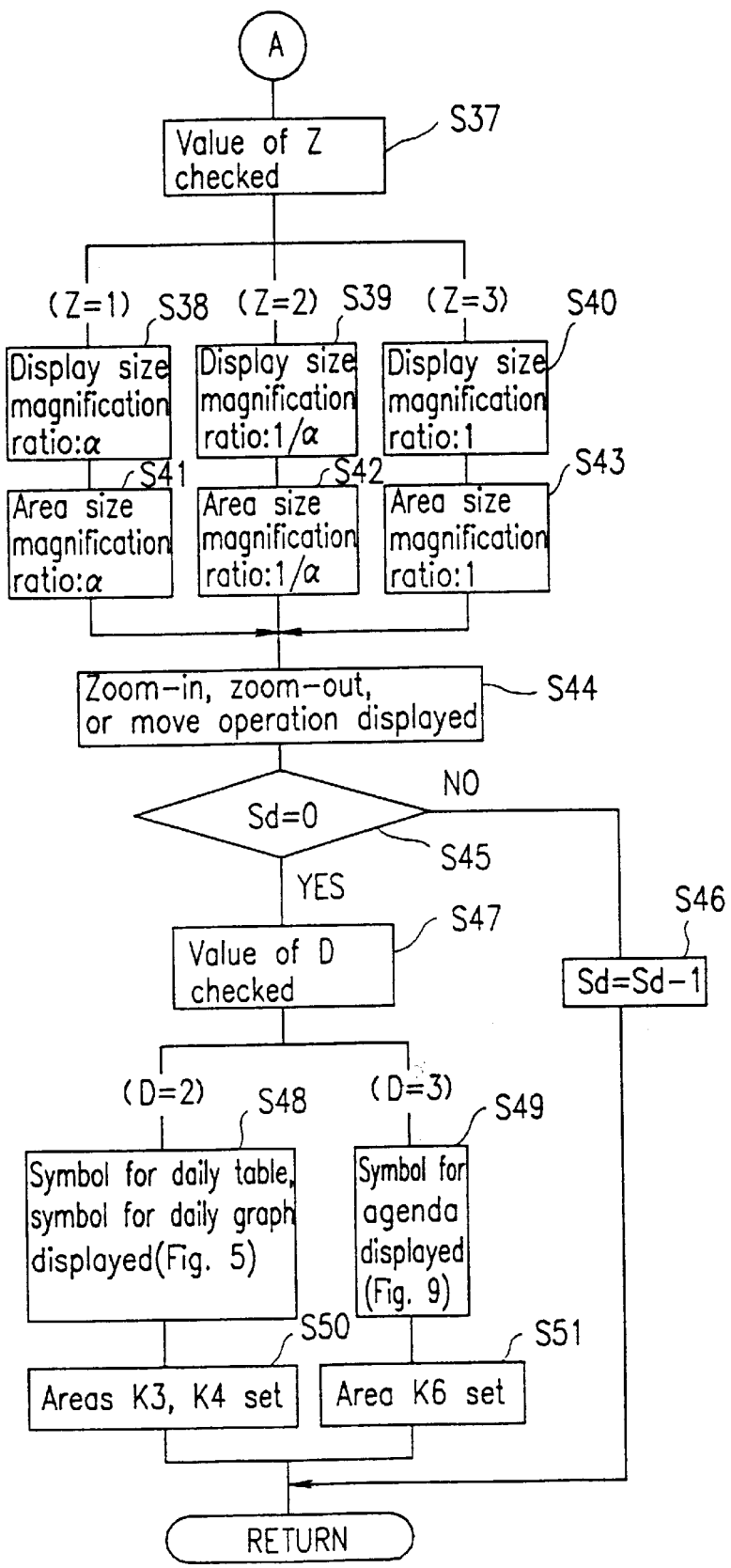

With reference to FIGS. 12 through 14, the operation of the CPU 32 of the information retrieval apparatus 100 for performing the execution explained above will be described.

FIG. 12 is a flowchart showing the overall operation of the CPU 32. In step S1, the CPU 32 displays the mode keys in the display section 44 (FIG. 1). The mode keys are used for selecting an application program to be executed by the CPU 32. As shown in FIG. 2, in this example, the calendar key 201, the telephone mode key 202, and the dictionary mode key 203 are displayed. If more application programs can be loaded in the information retrieval apparatus 100, more mode keys can be displayed in correspondence with the application programs.

In step S2, the CPU 32 sets areas MK1, MK2 and MK3 corresponding to the calendar key 201, the telephone mode key 202, and the dictionary mode key 203 on the touch panel 48. In this specification, the expression that "an area corresponding to X is set on the touch panel 48" signifies that the area is set on the touch panel 48 so that the position of the area on the touch panel 48 corresponds to the position of X on the screen of the display section 44.

In step S3, the CPU 32 checks whether or not any of the mode keys 201 through 203 has been pressed. Which of the mode keys has been pressed is detected by determining which area on the touch panel 48 includes the coordinate which has been input by the touch panel 48. When it is determined that the calendar mode key 201 has been pressed, the CPU 32 sets the value of mode variable M to "1" in step S4. Then, the CPU 32 displays the three operation keys, namely, the enlargement key 304, the reduction key 305 and the move key 306 (step S7), and then sets areas KZ1, KZ2 and KZ3 corresponding to the enlargement key 304, the reduction key 305 and the move key 306 on the touch panel 48 (step S8). In step S9, the CPU 32 initializes the value of display variable D to "1".

When it is determined in step S3 that the telephone mode key 202 has been pressed, the CPU 32 sets the value of mode variable M to "2" in step S5. When it is determined in step S3 that the dictionary mode key 203 has been pressed, the CPU 32 sets the value of mode variable M to "3" in step S6. In these two cases, the operations in steps S7 and S8 are the same as those described above.

When it is determined in step S3 that no key has been pressed, the operation jumps to step S10; i.e., the value of mode variable M which has been set most recently is maintained.

In step S10, the CPU 32 checks whether or not any value has been set for mode variable M. If M=1, the CPU 32 calls a subroutine in step S11 for executing the operation of the calendar mode. If M=2, the CPU 32 calls a subroutine in step S12 for executing the operation of the telephone mode. If M=3, the CPU 32 calls a subroutine in step S13 for executing the operation of the dictionary mode. If no value has been set for mode variable M, the operation goes back to step S3.

FIGS. 13 and 14 show a flowchart illustrating the operation of the CPU 32 in the calendar mode subroutine.

In step S14, the CPU 32 checks the value of display variable D. Since the initial value of the display variable D is "1" (step S9 in FIG. 12), the operation goes to step S15.

In step S15, the CPU 32 displays calendars for three months, namely, the current month, the previous month, and the subsequent month (FIG. 3) on the screen of the display section 44, and the operation advances to step S20. In step S20, the CPU 32 sets the areas K11, K12 and K13 corresponding to the calendars 301, 302 and 303 on the touch panel 48 (FIG. 1), and the operation advances to step S25.

In step S25, the CPU 32 checks whether or not any of the enlargement key 304, the reduction key 305 or the move key 306 has been pressed. Which of the keys has been pressed is detected by determining which area on the touch panel 48 includes the coordinate which has been input by the touch panel 48. When it is determined in step S25 that the enlargement key 304 has been pressed, the CPU 32 sets the value of operation variable Z to "1" in step S26.

When it is determined in step S25 that the reduction key 305 has been pressed, the CPU 32 sets the value of operation variable Z to "2" in step S27. When it is determined in step S25 that the move key 306 has been pressed, the CPU 32 sets the value of operation variable Z to "3" in step S28.

When it is determined in step S25 that no key has been pressed, the operation jumps to step S29; i.e., the value of operation variable Z which has been set most recently is maintained.

In step S29, which area has been pressed among the areas K11 through K13 and K2 through K8 set in accordance with the value of display variable D is determined. Since the value of display variable is still the initial value "1", the operation advances to step S30.

In step S30, the CPU 32 determines which calendar should be displayed among the calendar of the current month (month N), the calendar of the previous month (month N−1), and the calendar of the subsequent month (month N+1) in accordance with which area among areas K11, K12 and K13 has been pressed. Herein, "N" represents an integer of 1 to 12.

In step S31, the CPU 32 updates the value of display variable D to "2" in order to change the display 300 (FIG. 3) to the display 400 (FIG. 4). Then, the operation goes back to step S14. Since the value of display variable D is now "2", the operation goes to step S16.

In step S16, the CPU 32 displays the calendar of one month (the calendar 401 in FIG. 4) in the initial state on the screen of the display section 44 in accordance with the determination performed in step S30. Then, the operation advances to step S21, where the CPU 32 sets the area K2 corresponding to the day field 402 of the calendar 401 on the touch panel 48. When the area K2 is pressed, the operation goes to step S32 through step S25, one of steps S26 through S28, and step S29.

In step S32, the CPU 32 initializes the value of counting variable Sd to "N1". Herein, "N1" is a positive integer. Counting variable Sd is used for regulating the timing for displaying the symbols 501 and 502 (FIG. 5).

Referring to FIG. 14, in steps S37 through S43, the CPU 32 sets the magnification ratio of the display size and the magnification ratio of the area size in accordance with the value of operation variable Z as described below.

In step S37, the CPU 32 checks the value of operation variable Z. When Z=1, the operation key which has been pressed most recently is the enlargement key 304. In such a case, the CPU 32 sets the magnification ratio of the display size to "α" in step S38, and then sets the magnification ratio of the sizes of the areas K11 through K13 and K2 through K8 to "α" in accordance with the value of display variable D in step S41. The value "α" needs to be greater than "1", but the value of "α" is preferably as close as possible to "1" in order to perform continuous zoom-in and continuous zoom-out operations.

When Z=2 in step S37, the operation key which has been pressed most recently is the reduction key 305. In such a case, the CPU 32 sets the magnification ratio of the display size to "1/α" in step S39, and then sets the magnification ratio of the sizes of the areas K11 through K13 and K2 through K8 to "1/α" in accordance with the value of display variable D in step S42.

When Z=3 in step S37, the operation key which has been pressed most recently is the move key 306. In such a case, the CPU 32 sets the magnification ratio of the display size to "1" in step S40, and then sets the magnification ratio of the sizes of the areas K11 through K13 and K2 through K8 to "1" in accordance with the value of display variable D in step S43.

In step S44, the CPU 32 performs a zoom-in, zoom-out, or move operation, updating the display size, the area size, and the position of the areas in accordance with the magnification ratio of the display size and the magnification ratio of the area size set in steps S37 through S43.

In step S45, the CPU 32 determines whether the value of counting variable Sd is "0" or not. When it is determined in step S45 that the value of counting variable Sd is not "0", the value of counting variable Sd is decremented by "1" in step S46. When it is determined in step S45 that the value of counting variable Sd is "0", the operation advances to step S47. Such an operation in steps S45, S46 and S47 indicates that the operation advances to step S47 only after the operation in step S46 is repeated by the number which is equal to the value set for counting variable Sd. In other words, counting variable Sd regulates the operation to be advanced to step S47 only after the magnification ratio reaches the prescribed value.

In step S47, the CPU 32 checks the value of display variable D. Since the value of display variable D has been updated to "2" (step S31), the operation goes to step S48.

In step S48, the CPU 32 displays the symbol 501 representing the daily table and the symbol 502 representing the daily graph in the initial state (FIG. 5) on the screen of the display section 44. The symbols 501 and 502 are displayed in the day field 402 in FIG. 5 but can be displayed in any other area related to the day field 402 in the display 500.

In step S50, the CPU 32 sets the areas K3 and K4 respectively corresponding to the symbols 501 and 502 on the touch panel 48.

When it is determined in step S29 that the area K3 corresponding to the symbol 501 has been pressed, the operation goes to step S34.

In step S34, the CPU 32 updates the value of display variable D to "3" to change the display 600 to the display 700. Then, the operation goes back to step S14. Since the value of display variable D is now "3", the operation goes to step S17.

In step S17, the CPU 32 displays the daily table 701 in the initial state (FIG. 7) on the screen of the display section 44. Then, the operation advances to step S22, where the CPU 32 sets the area K5 corresponding to the daily table 701 on the touch panel 48. When the area K5 is pressed, the operation goes to step S33 through step S25, one of steps S26 through S28, and step S29.

In step S33, the CPU 32 initializes the value of counting variable Sd to "N2". Herein, "N2" is a positive integer. Counting variable Sd is used for regulating the timing for displaying the symbol 901 (FIG. 9).

Referring to FIG. 14 again, the operations in steps S37 through S45 are performed in the same manner as described above. Then, the operation goes to step S47 only after the operation in step S46 is repeated by the number which is equal to the value which is set for counting variable Sd.

In step S47, the CPU 32 checks the value of display variable D. Since the value of display variable D has been updated to "3" (step S34), the operation goes to step S49.

In step S49, the CPU 32 displays the symbol 901 representing the details of the product meeting in the initial state (FIG. 9) in the display section 44.

In step S51, the CPU 32 sets the area K6 corresponding to the symbol 901 on the touch panel 48.

When it is determined in step S29 that the area K6 corresponding to the symbol 901 has been pressed, the operation goes to step S36.

In step S36, the CPU 32 updates the value of display variable D to "5". Then, the operation goes back to step S14 and then advances to step S19.

In step S19, the CPU 32 displays the agenda 1001 of the product meeting in the initial state (FIG. 10). Then, the operation advances to step S24, where the CPU 32 sets the area K7 corresponding to the agenda 1001 on the touch panel 48. Then, the similar operation is performed in steps S24 through S29 including the subroutine shown in FIG. 14.

In the case when K=4 in step S29 and in the case when D=4 in step S14, the operation is performed in a similar manner.

It can be appreciated by those skilled in the art that the telephone mode operation and the dictionary mode operation are performed in similar manners.

The system program of the information retrieval apparatus 100 for executing the operation described above with reference to FIGS. 12 through 14 is stored in the ROM 34 (FIG. 1). Mode variable M, display variable D, operation variable Z, counting variable Sd, initial values N1 and N2, and the like which are used to control the execution of the system program are stored in the RAM 36 (FIG. 1).

Hereinafter, control of display of image information on the screen of the display section 44 (FIG. 1) performed by the CPU 32 will be described, using the change from the display 400 in FIG. 4 to the display 500 in FIG. 5 as an example.

Figure 15A:
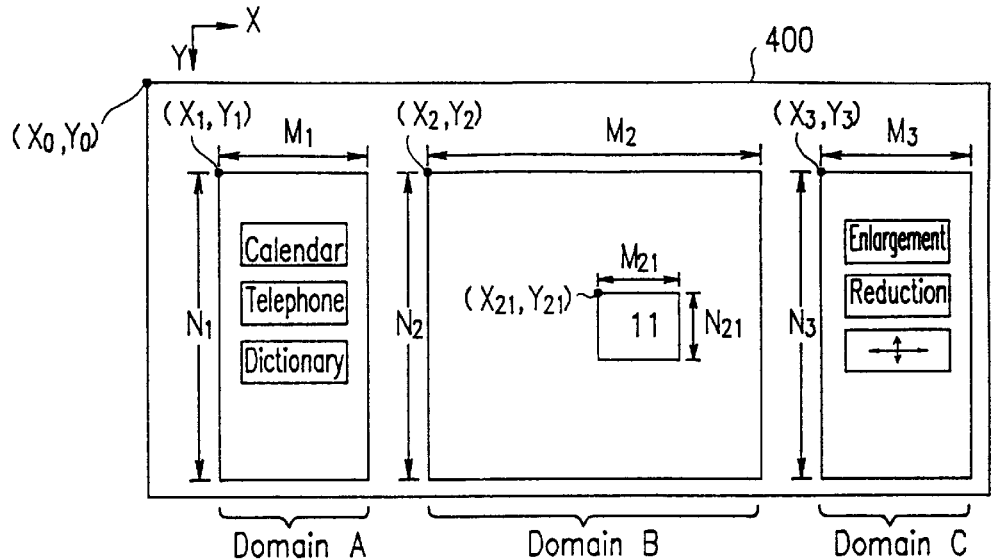
FIG. 15A shows an arrangement of image information in a display shown in FIG. 4.
Figure 15B:
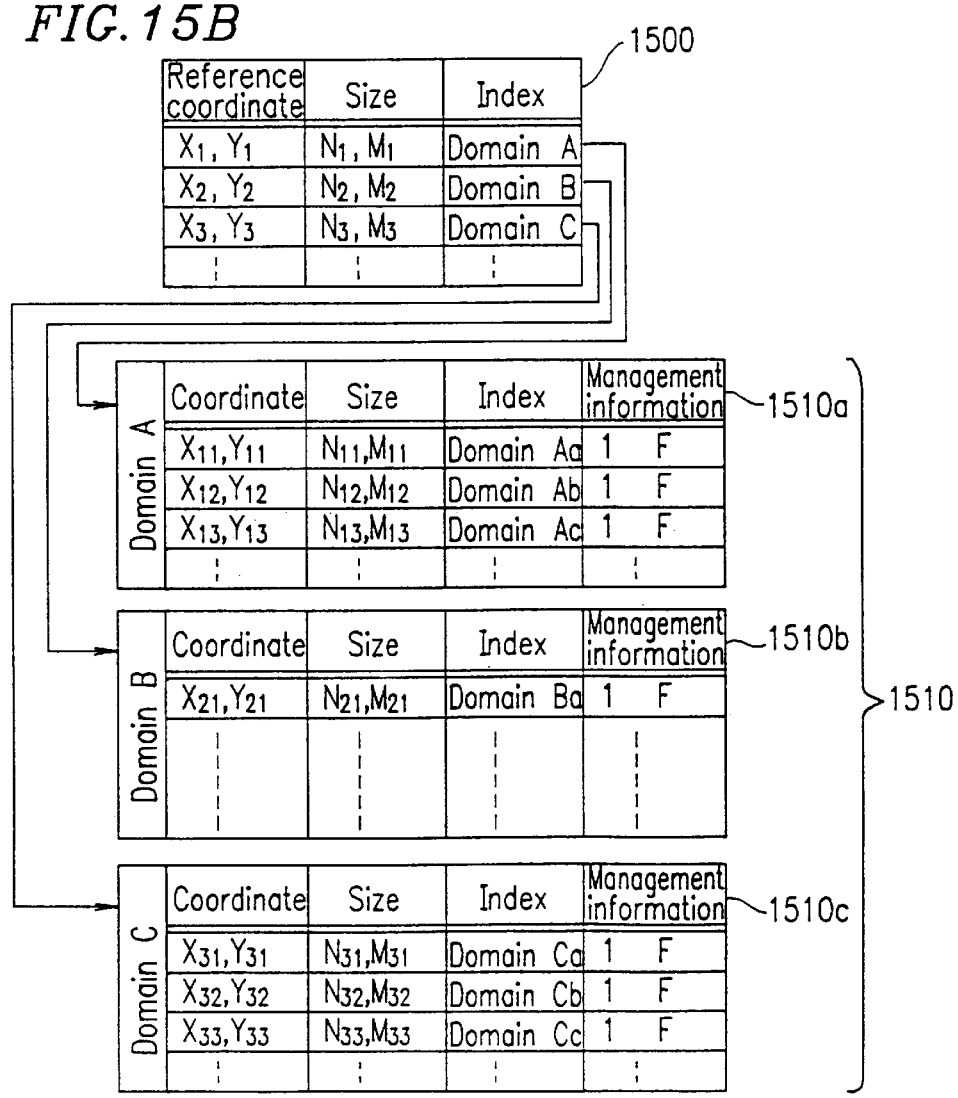
FIG. 15B shows a position management table and a coordinate management table group for managing the arrangement of the image information shown in FIG. 15A.

FIG. 15A shows an arrangement of image information in the display 400 (FIG. 4), and FIG. 15B shows a position management table 1500 and a coordinate management table group 1510 for managing the arrangement of the image information shown in FIG. 15A.

The position management table 1500 and the coordinate management table group 1510 are stored in the RAM 36 (FIG. 1). Each time the display size and the area size are updated in step S44 (FIG. 14), the CPU 32 updates the contents of the position management table 1500 and the coordinate management table group 1510. Thus, the display on the screen of the display section 44 is continuously matched with the contents of the position management table 1500 and the coordinate management table group 1510.

The position management table 1500 manages the arrangement of a plurality of domains. In this example, domain A corresponds to the areas in which the mode keys are displayed, domain B corresponds to the areas in which the application programs are displayed, and domain C corresponds to the areas in which the operation keys are displayed. As shown in FIG. 15B, columns 1 (left) through 3 (right) in the position management table 1500 respectively show the reference coordinate, size and index of the domains A, B and C. The reference coordinate of each domain is a relative coordinate with respect to the origin which is positioned at the bottom left corner of the coordinate system on the display ($X_0$, $Y_0$). The reference coordinate represents the top left corner of the domain. The size of each domain represents the lengths of the domain from the reference coordinate in the directions of the X and Y axes. The index of each domain is a pointer to the detailed information of the corresponding domain.

The coordinate management table group 1510 manages the arrangement of the image information included in each domain. In this example, the coordinate management table group 1510 includes coordinate management tables 1510a, 1510b and 1510c. The coordinate management table group 1510 can include any number of coordinate management tables in accordance with the number of domains into which a display is divided.

The coordinate management table 1510a manages the arrangement of image information corresponding to the calendar mode key 201, image information corresponding to the telephone mode key 202, and image information corresponding to the dictionary mode key 203 (domain A). The coordinate management table 1510c manages the arrangement of image information corresponding to the enlargement key 304, image information corresponding to the reduction key 305, and image information corresponding to the move key 306 (domain B). In this example, the contents of the coordinate management tables 1510a and 1510c are not updated even if the zoom-in or zoom-out operation is performed.

The coordinate management table 1510*b* manages the arrangement of image information corresponding to the day field 402 (domain B). In FIG. 15B, only the image information corresponding to the day field 402 of Aug. 11, 1995 is stored in the coordinate management table 1510*b* for simplicity. In actual operation, all the image information corresponding to the day fields 402 corresponding to Aug. 1, 1995 through Aug. 31, 1995 is stored in the coordinate management table 1510*b*. In this example, the contents of the coordinate management table 1510*b* are updated in accordance with the zoom ratio during the zoom-in or zoom-out operation.

Columns 1 (leftmost) through 4 (rightmost) in each of the coordinate management tables 1510*a*, 1510*b* and 1510*c* respectively show the reference coordinate, size, index, and management information of the corresponding image information. The reference coordinate is a relative coordinate with respect to the reference coordinate of the corresponding domain. The reference coordinate represents the top left corner of the area of the image information. The size represents the lengths of the area of the corresponding image information from the reference coordinate in the directions of the X and Y axes. The index is an address in the ROM 34 or the file memory 56 (FIG. 1) at which character data or pixel data of the corresponding image information is stored. For example, index "domain Aa" in the coordinate management table 1510*a* is the address in the ROM 34 at which character data "calendar" is stored. The character data "calendar" is developed into pixel data when being displayed on the screen of the display section 44. In the case where the ROM 34 or the file memory 56 stores pixel data "11", index "domain Ba" in the coordinate management table 1510*b* can be the address in the ROM 34 or the file memory 56 at which the pixel data "11" is stored. Such pixel data is stored in the ROM 34 or the file memory 56 at a highest possible resolution. The index of the image information can be a pointer for the coordinate conversion table which is more specific than the coordinate management table group 1510. The management information in column 4 includes a hierarchical level of the corresponding image information and a flag which indicates whether or not the image information is displayed on the currently displayed layer.

Figure 16A:
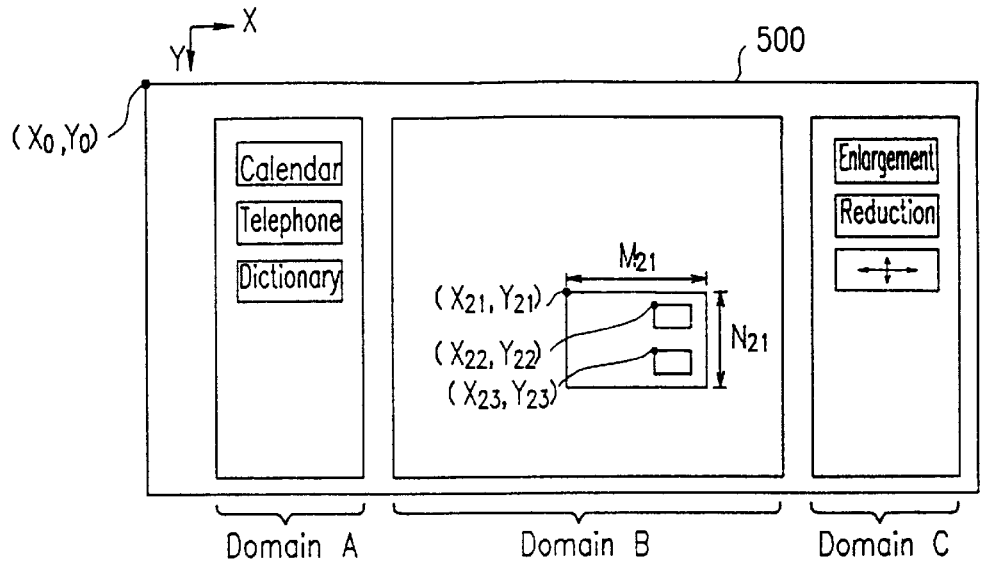
FIG. 16A shows an arrangement of image information in another display shown in FIG. 5.

FIG. 16A shows an arrangement of image information in the display 500 (FIG. 5). In domain B, the arrangement of the image information has been changed from that of FIG. 15A. Specifically, the position and size of the image information corresponding to the day field 402 of Aug. 11, 1995 has been changed by the zoom-in operation, and image information corresponding to the symbols 501 and 502 newly appears.

Figure 16B:
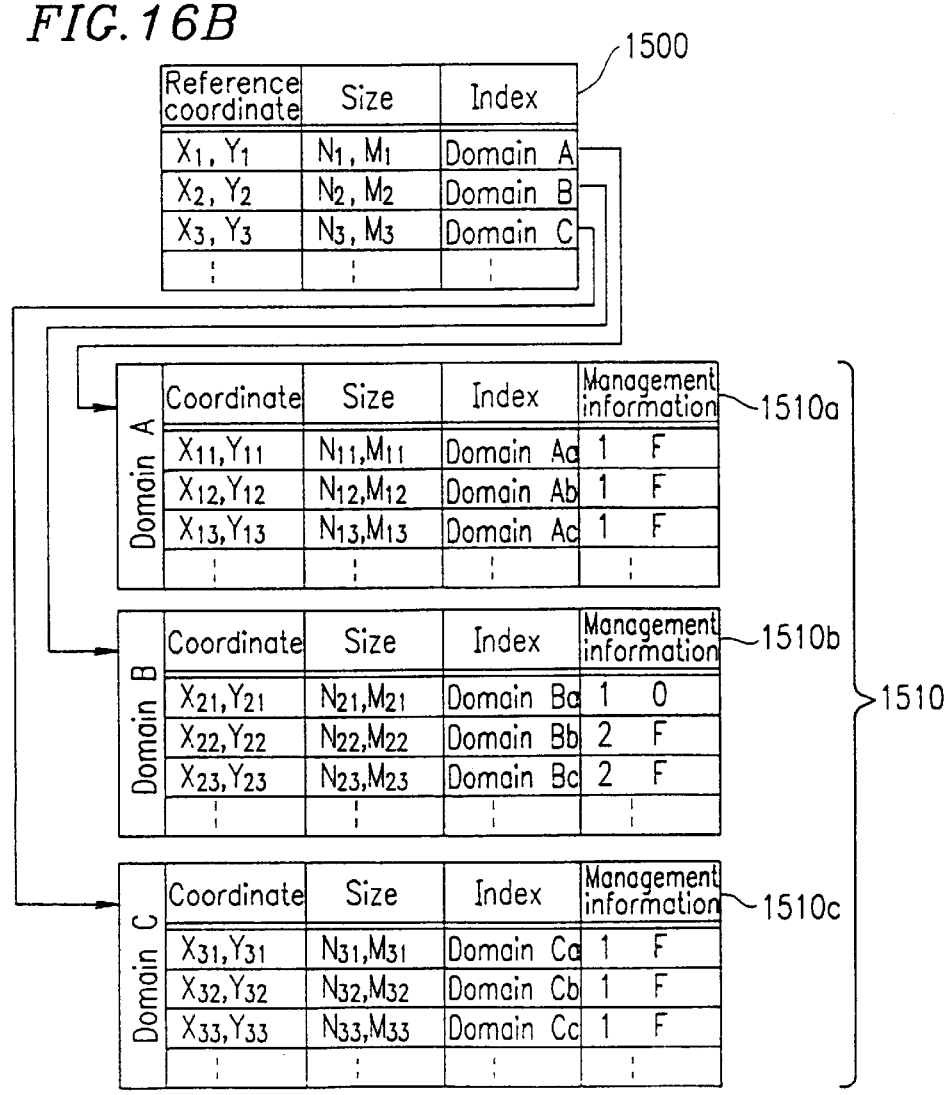
FIG. 16B shows a position management table and a coordinate management table group for managing the arrangement of the image information shown in FIG. 16A.
Figure 19:
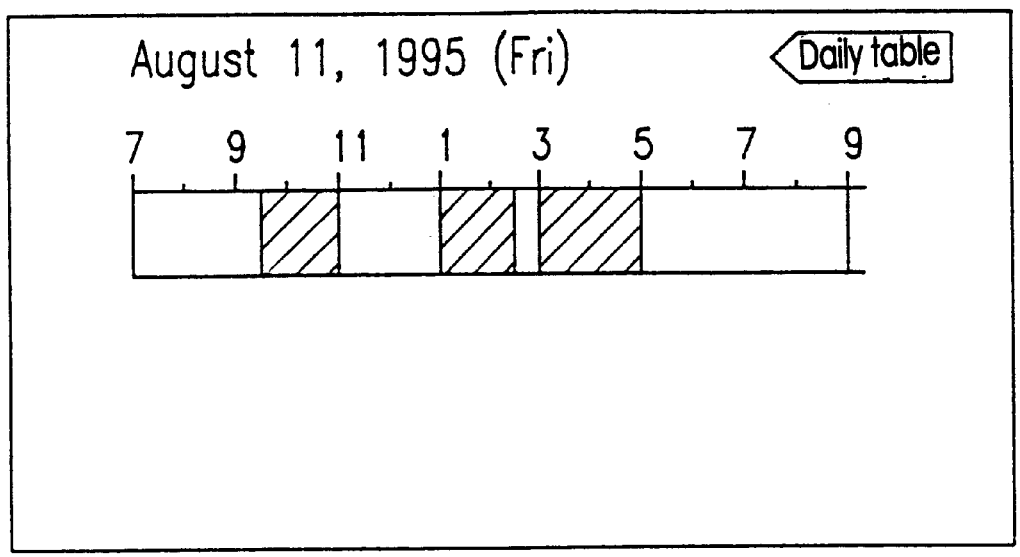
Figure 20:
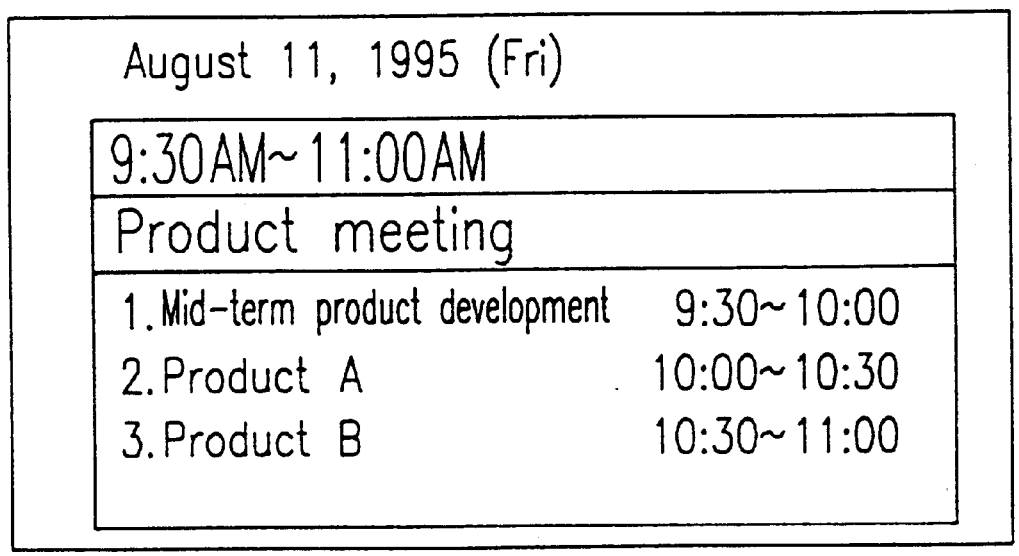

FIG. 16B shows the position management table 1500 and the coordinate management table group 1510 for managing the arrangement of the image information shown in FIG. 16A. The contents of the position management table 1500, and the coordinate management tables 1510*a* and 1510*c* are identical with those shown in FIG. 15B and descriptions thereof will be omitted.

The coordinate management table 1510*b* includes the image information corresponding to the symbols 501 and 502 in addition to the contents thereof shown in FIG. 15B. The hierarchical level of the image information corresponding to the symbols 501 and 502 is 2, which means such image information is displayed overlaying the image information corresponding to the day field 402 (hierarchical level: 1). Addition of new image information is performed by the CPU 32 in step S44 (FIG. 14) during the zoom-in operation. Deletion of image information from the coordinate management table 1510*b* is performed also by the CPU 32 during the zoom-out operation. By such deletion, the symbols 501 and 502 are deleted from the display 500.

Pixel data is stored in the ROM 34 or the file memory 56 at a highest possible resolution. During the zoom-in operation, the CPU 32 develops and displays the pixel data in a prescribed area by decreasing the dot omitting ratio of the pixel data as the zoom ratio increases. Accordingly, the pixel data is displayed at the highest possible resolution when the zoom ratio is highest. Thus, the resolution of the domain data increases but the viewability declines.

During the zoom-out operation, the CPU 32 develops and displays the pixel data in a prescribed area by increasing the dot omitting ratio of the pixel data as the zoom ratio decreases. Thus, the viewability of the domain data to be stored rises.

Hereinafter, how the CPU 32 determines which area has been pressed in step 29 (FIG. 13) will be described.

As described above, the coordinate (X, Y) output from the touch panel 48 is converted from the analog value into a digital value by the A/D converter 52 and then is sent to the CPU 32. The coordinate (X, Y) output from the touch panel 48 is an absolute coordinate with the coordinate at the bottom left corner of the coordinate system on the display as the origin ($X_0$, $Y_0$). The CPU 32 determines which area has been pressed by comparing the absolute coordinate (X, Y) and the relative coordinate stored in the position management table 1500 and the coordinate management table group 1510.

For example, the position management table 1500 and the coordinate management table group 1510 are in the state shown in FIG. 16B. If $$(X_2+X_{22}) \leq X \leq (X_2+X_{22}+M_{22})$$

and $$(Y_2+Y_{22}) \leq Y \leq (Y_2+Y_{22}+N_{22}),$$

the CPU 32 determines that the area K3 corresponding to the symbol 501 has been pressed. In the same manner, if $$(X_2+X_{23}) \leq X \leq (X_2+X_{23}+M_{23})$$

and $$(Y_2+Y_{23}) \leq Y \leq (Y_2+Y_{23}+N_{23}),$$

the CPU 32 determines that the area K4 corresponding to the symbol 502 has been pressed.

By displaying the image information and checking which area has been pressed based on an identical table group, the position of the image information displayed on the screen of the display section 44 and the position of the area which is set on the touch panel 48 can be the same.

According to the present invention, information retrieval can be smoothly performed from general information to specific information during the zoom-in operation. In the same manner, information retrieval can be smoothly performed from specific information to general information during the zoom-out operation.

In a conventional information retrieval apparatus, the user needs to operate a particular switch in order to change from one display to another. In contrast, in an information retrieving apparatus according to the present invention, the displays can be continuously changed automatically during the zoom-in or zoom-out operation of the image data displayed on the screen. In other words, the information retrieval apparatus according to the present invention provides a user interface which is appropriate to convey the user's intention more directly.

As can be appreciated from the above description, the displays can be continuously changed by zooming in or zooming out the image data on the screen in an information retrieval apparatus according to the present invention, whereas the user needs to operate a particular switch in order to change the display to another display in a conventional information retrieval apparatus. Thus, the information retrieval apparatus according to the present invention provides a user interface which is appropriate to convey the user's intention more directly.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information retrieval apparatus, comprising:

a display section for displaying a first image;

an enlargement section for continuously enlarging the first image displayed by the display section in response to an instruction of the user; and a determination section for determining that a magnification ratio of the first image enlarged by the enlargement section has reached a prescribed value, wherein when the magnification ratio is determined to have reached the prescribed value, the display section displays at least one second image at a position related to the first image; and when the first image is still enlarged by the enlargement section, the enlargement section enlarges the at least one second image at a magnification ratio equal to the magnification ratio used for enlarging the first image.

2. An information retrieval apparatus according to claim 1, further comprising a selection section for selecting the first image, wherein the enlargement section increases the magnification ratio of the first image in proportion to a time period in which the first image is selected by the selection section.

3. An information retrieval apparatus according to claim 1, further comprising a reduction section for continuously reducing the at least one second image displayed by the display section in response to an instruction of the user, wherein when the magnification ratio of the at least one second image reduced by the reduction section reaches a prescribed value, the display section deletes the at least one second image.

4. An information retrieval apparatus according to claim 3, further comprising another selection section for selecting the at least one second image, wherein the reduction section decreases the magnification ratio of the at least one second image in proportion to a time period in which the at least one second image is selected by the another selection section.

5. An information retrieval apparatus according to claim 2, wherein the selection section is a touch panel.

6. An information retrieval apparatus according to claim 4, wherein the selection section is a touch panel.

7. An information retrieval method, comprising the steps of:

displaying a first image;

continuously enlarging the first image displayed in the step of displaying in response to an instruction of the user;

determining that a magnification ratio of the first image enlarged in the step of enlarging has reached a prescribed value, and displaying at least one second image at a position related to the first image when the magnification ratio is determined to have reached the prescribed value, and then, when the first image is still enlarged by the enlargement section, enlarging the at least one second image at a magnification ratio equal to the magnification ratio used for enlarging the first image.

8. An information retrieval method according to claim 7, further comprising the step of selecting the first image, wherein the step of enlarging includes the step of increasing the magnification ratio of the first image in proportion to a time period in which the first image is selected in the step of selecting.

9. An information retrieval method according to claim 7, further comprising the steps of:

continuously reducing the at least one second image displayed in the step of displaying in response to an instruction of the user; and deleting the at least one second image when the magnification ratio of the second image reduced by the reduction section reaches a prescribed value.

10. An information retrieval method according to claim 9, further comprising the step of selecting the at least one second image, wherein the step of reducing includes the step of decreasing the magnification ratio of the at least one second image in proportion to a time period in which the at least one second image is selected in the step of selecting.

* * * * *